United States Patent [19]

Harnden, Jr.

[11] 4,068,281
[45] Jan. 10, 1978

[54] THERMALLY RESPONSIVE METAL OXIDE VARISTOR TRANSIENT SUPPRESSION CIRCUIT

[75] Inventor: John D. Harnden, Jr., Schenectady, N.Y.

[73] Assignee: General Electric Company, Schenectady, N.Y.

[21] Appl. No.: 723,567

[22] Filed: Sept. 15, 1976

[51] Int. Cl.² .............................................. H02H 5/04
[52] U.S. Cl. ..................................... 361/106; 361/54; 338/20; 338/92
[58] Field of Search ............... 361/106, 103, 110, 111, 361/91, 56, 54; 338/20, 21, 22 SD, 22 R, 23, 7; 307/252 R, 252 A, 117, 310; 357/28; 73/362 SC

[56] References Cited

U.S. PATENT DOCUMENTS

| | | | |
|---|---|---|---|
| 3,564,293 | 2/1971 | Mungenast | 361/106 X |
| 3,600,650 | 8/1971 | Obenhaus | 338/22 X |
| 3,622,849 | 11/1971 | Kelley, Jr. | 361/103 X |
| 3,708,720 | 1/1973 | Whitney et al. | 361/106 X |
| 3,742,419 | 6/1973 | Martzloff | 338/22 X |
| 3,754,200 | 8/1973 | Harnden, Jr. | 338/20 |
| 3,818,411 | 6/1974 | Harnden, Jr. | 338/20 |

Primary Examiner—Donovan F. Duggan
Assistant Examiner—Patrick R. Salce
Attorney, Agent, or Firm—Jack E. Haken; Joseph T. Cohen; Jerome C. Squillaro

[57] ABSTRACT

A temperature responsive resistor is thermally connected to a body of metal oxide varistor material in transient suppression and other applications. In the event of excess energy dissipation in the varistor, the temperature of the thermally responsive resistor increases to provide a trigger signal to a triac or other similar electronic switch which may be utilized to provide an alarm, provide increased cooling to the varistor body, to divert, or limit current flow from the varistor.

Current flow through the temperature responsive resistor may be provided from a third terminal on the metal oxide varistor in which case the circuit is responsive to both total energy dissipation and peak energy dissipation levels in the varistor.

9 Claims, 9 Drawing Figures

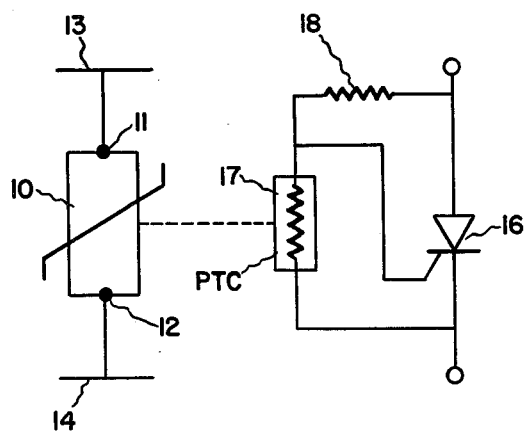
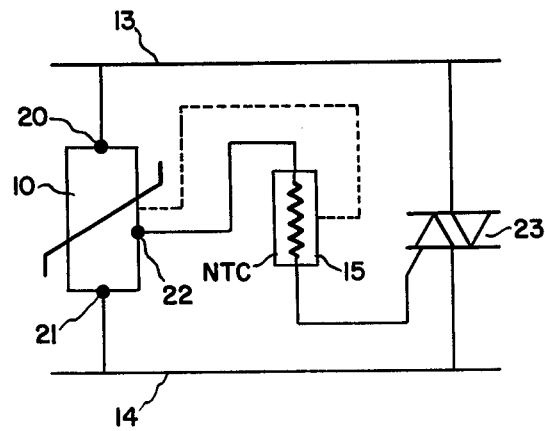
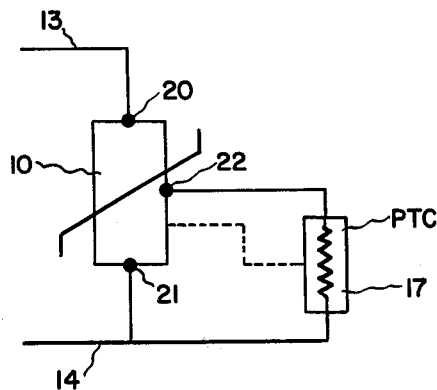
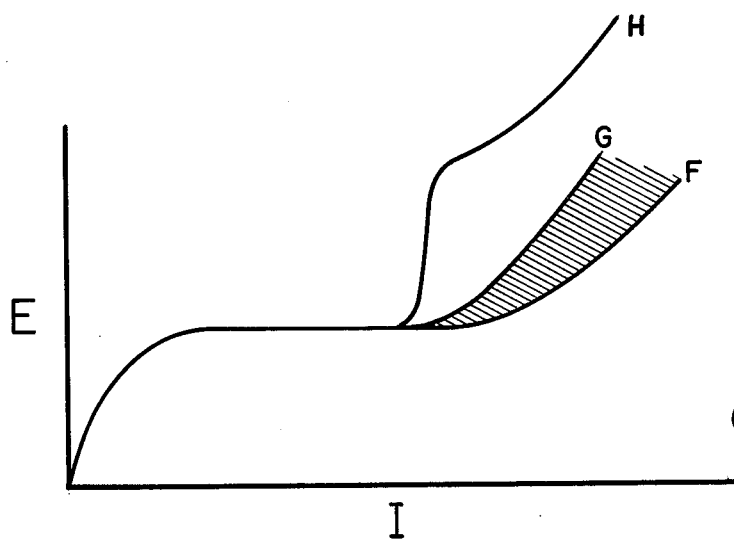

4,068,281

THERMALLY RESPONSIVE METAL OXIDE VARISTOR TRANSIENT SUPPRESSION CIRCUIT

BACKGROUND OF THE INVENTION

This invention relates to transient suppression circuits comprising metal oxide varistors. More specifically, this invention relates to metal oxide varistor circuits which incorporate thermally responsive elements to achieve time delayed responses.

There are a few known materials which exhibit non-linear resistance characteristics and which require resort to the following equation to quantatively relate current and voltage:

$$I = (V/C)^\alpha$$

where $V$ is the voltage between two points separated by a body of the material under consideration, $I$ is the current flowing between the points, $C$ is a constant, and $\alpha$ is an exponent greater than 1. Both $C$ and $\alpha$ are functions of the geometry of the body formed from the material and the composition thereof, and $C$ is primarily a function of the material grain size whereas an $\alpha$ is primarily a function of the grain boundaries. Materials such as silicon carbide exhibit non-linear or exponential resistance characteristics and are utilized in commercial varistors, however, such non-metallic varistors generally exhibit an alpha exponent of no more than 6.

A new family of varistor materials having alpha exponents in excess of 10 within the current density range of $10^{-3}$ to $10^2$ amps/$^2$cm has recently been produced from metal oxides. The metal oxide varistor material is a polycrystalline ceramic formed from a particular metal oxide with small quantities of one or more of other metal oxides being added. As one example, the predominant metal oxide is zinc oxide with small quantities of bismuth oxide and other transition metal oxides or post-transistion metal oxides being added. The predominant metal is sintered with the additive oxides to form a ceramic, metal oxide body. Since the metal oxide varistors are fabricated as a ceramic powder, the metal oxide varistor material can be pressed into a variety of shapes of various sizes. Being polycrystalline, the characteristics of metal oxide varistor are determined by the grain size, grain boundary and thickness: all of which can be controlled in a ceramic fabrication process.

The non-linear resistance relationship of metal oxide varistors is such that the resistance is very high (up to a least 10,000 megohms) at very low current levels in the microampere range, and progresses in a non-linear manner to an extremely low value (tenths of an ohm) at high current levels. These non-linear resistance characteristics result in voltage versus current characteristics wherein the voltage is effectively limited, the voltage limiting or clamping action being enhanced at the higher values of the $\alpha$ exponent. Thus, the voltage versus current characteristics of metal oxide varistors is similar to that of symmetrically bidirectional Zener diodes and covers a greater current range than that of Zener diodes. The conduction mechanism in metal oxide varistors is not yet clearly understood but is completely unlike the avalanche mechanism associated with Zener diodes.

Metal oxide varistors and method of manufacture are described, for example, in U.S. Pat. Nos. 3,496,512 and 3,503,029 to Matsuoka el al., wich are incorporated herein by reference as background material.

Bodies of metal oxide varistors material have commonly been utilized to suppress electrical transients at switch contacts an in power utilization circuits. A comprehensive review of the use of metal oxide varistors for such purposes is described in the *Transient Voltage Suppression Manual*, edited by David C. Kay, and published by the General Electric Company, Semiconductor Products Department, Syracuse, N.Y., 1976. Specific examples of metal oxide varistor bodies utilized in transient suppression applications are described, for example, in U.S. Pat. Nos. 3,693,053 to Anderson, 3,710,058 to Harnden, 3,710,061 to Harnden, etc.

It has been common to measure power absorbed in metal oxide varistors through additional terminals attached to the face of the varistor body as described, for example in Pat. Nos. 3,742,419 to Martzloff and 3,818,411 to Harnden. The above patents are incorporated by reference herein as background material.

SUMMARY OF THE INVENTION

In accordance with the present invention, a thermally responsive device, for example, a positive temperature coefficient resistor or a negative temperature coefficient resistor, is thermally bonded to a mass of metal oxide varistor material. The non-linear electrical characteristics of the metal oxide varistor act to rapidly increase the temperature of the varistor body in response to voltage transients which exceed a nominal varistor breakdown voltage. The temperature increase is sensed by the thermally responsive device which may then be utilized to activate electrical protective devices, for example, crowbar SCR's or TRIACS, to remove the transient condition, or to activate additional coolant flow to the varistor body.

The sensing of overload conditions with a temperature responsive device necessarily incorporated a short time delay which is associated with the thermal time constant of the varistor and temperature responsive device. The metal oxide varistor may, thereby, function to absorb transient energy within its power ratings and, yet, is thermally protected in the event the energy of a transient exceeds those ratings.

The electrical current controlled by the thermally responsive device may, if desired, be obtained from an additional electrode spaced between the main electrodes on the body of the varistor material. The resultant device is, then, responsive to both the electrical and thermal condition of the varistor body and will trigger the protective circuits in response to a combined function of the peak and average power levels in the varistor.

It is, therefore, an object of this invention to provide circuits for protecting metal oxide varistors from thermal overload.

Another object of this invention is to provide circuits and devices which are responsive to both peak and average power levels in metal oxide varistor protective elements.

BRIEF DESCRIPTION OF THE DRAWINGS

The novel features believed characteristic of the present invention are set forth in the appended claims. The invention itself, together with further objects and advantages thereof, may best be understood by reference to the following detailed description taken in connection with the appended drawings in which:

FIG. 5 is a circuit wherein a positive temperature coefficient resistor is thermally coupled to a metal oxide varistor and acts to trigger a silicon controlled rectifier;

FIG. 6 is a circuit wherein a negative temperature coefficient resistor is thermally and electrically coupled to a metal oxide varistor and acts to control a crowbar triac;

FIG. 7 is a circuit wherein a positive temperature coefficient resistor is thermally and electrically coupled to a metal oxide varistor;

FIG. 8 is the voltage-current characteristic of the circuits of FIGS. 7 and 9.

DESCRIPTION OF THE PREFERRED EMBODIMENTS

A common application of metal oxide varistors is the suppression of transient over-voltage conditions on power supply circuits. The conduction current through the varistor increases rapidly to absorb transient energy as line voltage exceeds a threshold value. The transient energy which may be absorbed in a given varistor is, of course, determined by the size, heat sinking, and thermal characteristics of the varistor. It is imperative, however, that suitable protective circuitry be provided to prevent the destruction of the varistor body in the event that transient energy exceeds allowable limits.

Figure 1:
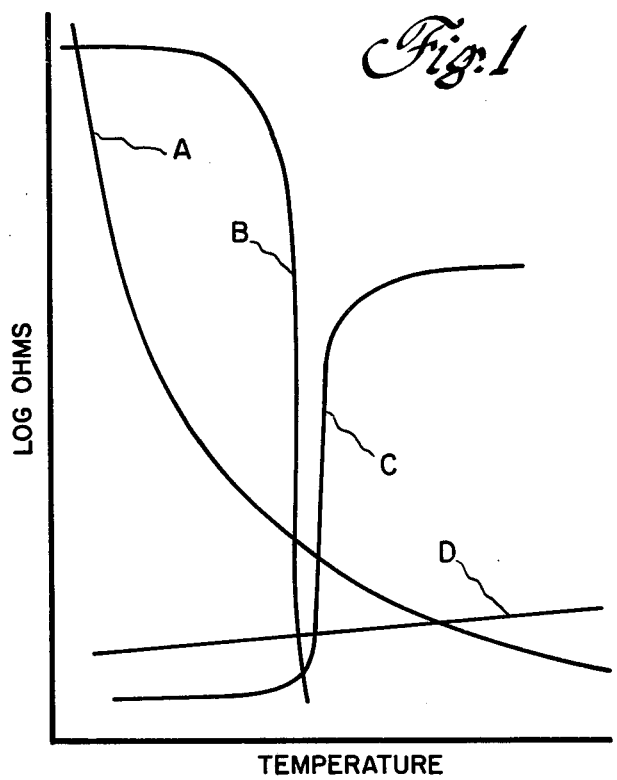
FIG. 1 illustrates the voltage-resistance characteristics of several classes of temperature dependent resistor materials.

There are several classes of materials which exhibit an electrical resistance characteristic which varies as a non-linear function of temperature. FIG. 1 illustrates typical temperature-resistance curves for such materials. Curve A is typical of conventional negative temperature coefficient materials, for example, Co-Ni oxide thermistors which may exhibit a temperature coefficient of approximately 4.9 percent/deg C which are described, for example, in an article, *Thermistors . . . 10° to 600° K*, by H. B. Sachse, Electronic Industries, October 1959. Negative temperature coefficient resistors may also be manufactured with a sharp break characteristic, illustrated by curve B, wherein the resistance of a device changes abruptly at a temperature which is determined by the composition and geometry of the device. Examples of such a device, which may comprise compositions of vanadium oxide, are given in *Effects of Various Doping Elements on the Transition Temperature of Vanadium Oxide Semiconductors* by Futaka et al., Japanese Journal of Applied Physics, Vol. 8, No. 8, August 1959. Sharp-break, positive resistance characteristics are illustrated by curve C and are typical of resistors which are described in *Properties and Applications of PTC Thermistors* by E. Andrich, Electronic Applications, 26, 123 (1966). Curve D of FIG. 1 is a linear positive resistance characteristic which is typical of most metals.

Figure 2:
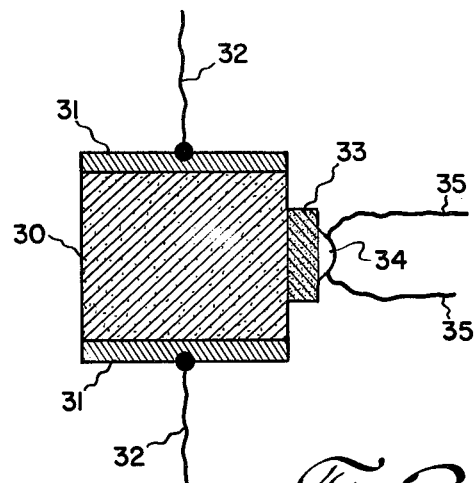
FIG. 2 is a temperature dependent resistor thermally connected to a metal oxide varistor element.

FIG. 2 is a varistor-resistor device of the present invention. A body of metal oxide varistor material 30 has at least two metallized electrodes 31 attached thereto. Wire leads 32 may be bonded to the electrodes 31 to permit connection to other circuit components. A body of thermally conductive, electrically insulating material 33 is attached to the varistor body 30. The body 33 should, typically, have a coefficient of thermal expansion which is matched to the varistor material 30 and may, for example, comprise BeO. A temperature dependent resistor body 34, which may be, for example, one of the devices described in the preceding paragraph is attached to the insulating body 33. Leads 35 are attached to the resistor 34 to permit connection to other circuit elements.

Figure 3:
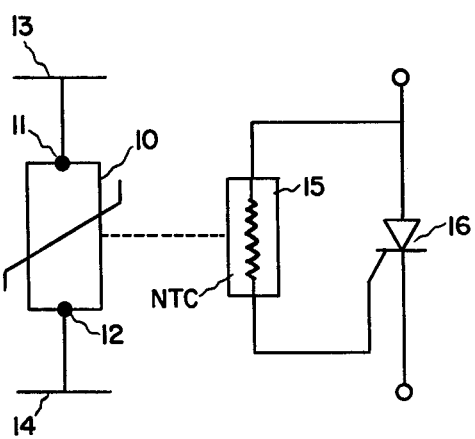
FIG. 3 is a circuit wherein a negative temperature coefficient resistor is thermally coupled to a metal oxide varistor and acts to trigger a silicon controlled rectifier.

FIG. 3 is a circuit which may be used to monitor and control the power dissipated in a metal oxide varistor. A metal oxide varistor 10 having two terminals 11 and 12 is connected across the conductors 13 and 14 of a power supply in a typical transient absorption application. The voltage across the conductors 13 and 14 will, normally, be sufficiently low to prevent substantial conduction through the varistor body 10. In the event of a transient voltage increase between the conductors 13 and 14, current flow through varistor 10 increases rapidly to ab rb the transient energy in the varistor body.

A negative temperature coefficient resistor 15 is thermally connected to the body of the varistor 10. Negative temperature coefficient resistors are typically fabricated from oxides of cobalt, nickel, molybdenum, and other metals in a manner well known in the art. The negative temperature coefficient resistor may either be a sharp-break device or a continuous slope varistor with, for example, a temperature coefficient of approximately −4.6 percent/deg C. The negative temperature coefficient resistor 15 is connected between the gate and anode of a silicon controlled rectifier (SCR) 16. The anode and cathode terminals of the SCR may be connected, as a static or dynamic switch, to control an alarm device, for example, a bell or light, or to supply power to a motor to increase air or other coolant flow over the metal oxide varistor body 10.

Metal oxide varistors have been utilized, in the prior art, to electrically trigger SCR's or similar devices in the event a threshold current level was exceeded. Such circuits, however, generally provide instantaneous alarm functions in the event a voltage transient exceeded a threshold. The circuit of FIG. 3 provides a time delay, determined by the thermal characteristics of the varistor 10 and the resistor 15, which prevents activation of the alarm or coolant circuit until the energy absorbed in the varistor exceeds an allowable level.

Figure 4:
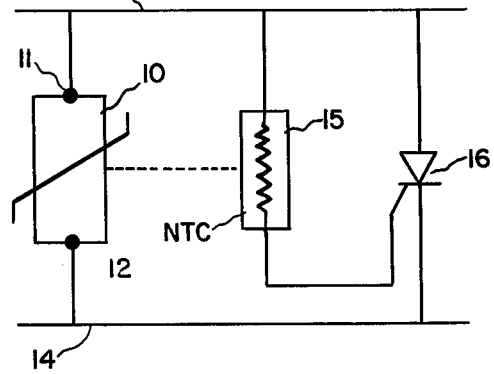
FIG. 4 is a circuit wherein a negative temperature coefficient resistor is thermally coupled to a metal oxide varistor and acts to trigger a crowbar silicon controlled rectifier.

FIG. 4 is a circuit similar to that shown in FIG. 3 wherein the SCR 16 is connected as a crowbar across the terminals of the varistor 10. Small transients between the power supply lines 13 and 14 are absorbed in the varistor 10. Large transients, which might otherwise heat the varistor 10 above its thermal limits, act to heat the negative temperature coefficient resistor 15 and thus trigger the crowbar SCR 16 to divert current flow from the varistor into the silicon controlled rectifier 16 or another suitable load. The advantage of the circuit depicted in FIG. 4 is that the SCR does not immediately, but has a built-in time delay inasmuch as the negative temperature coefficient resistor must thermally respond. Thus, if the transient is small or of short duration, and can be effectively handled by the varistor 10, the SCR 16 will not fire.

An advantage of using a varistor on such a circuit is that the varistor steady-state temperature increases rapidly in its high conductivity state due to the substantial, non-linear increase in current.

FIG. 5 is a variation of the circuit in FIG. 3 wherein a positive temperature coefficient resistor 17 is thermally connected to the varistor 10 and electrically connected between the cathode and gate electrodes of the SCR 16. A conventional resistor 18 is connected between the anode and gate terminals of the SCR to form a voltage divider with the resistor 17 and to set the gate voltage. As the temperature of the varistor 10 increases, the resistance of the positive temperature coefficient resistor 17 likewise increases. The bias voltage on the gate of the SCR is raised to a level sufficient to fire the SCR 16 and trigger an alarm or cooling device in the manner described above with reference to FIG. 3.

FIG. 6 is a crowbar circuit which is responsive to both the peak energy level and the total energy in a voltage transient. Opposite terminals 20 and 21 on a body of varistor material 10 are connected across power supply bus lines 13 and 14. A third terminal 22 is provided on varistor body 10 to monitor instantaneous power flow through the varistor 10, in a manner described in the above referenced patents. A negative temperature coefficient resistor 15 is thermally connected to the varistor body 10 and is electrically connected between the third varistor electrode 22 and the gate of a switching device, for example, a triac 23. The cathode and anode terminals of the triac 23 are connected across the varistor body at terminals 20 and 21 to provide a crowbar function, as described above with reference to FIG. 4. In the event that the average power in a transient exceeds the thermal limit of the varistor 10, the temperature of the negative temperature coefficient resistor 15 will increase, causing an increased current flow to the gate of the triac 23 in the manner described above with reference to FIG. 4. The voltage of the terminal 22 of the varistor is, however, dependent on the instantaneous current flow through the varistor. Thus, in the event of extremely large transient peaks, an increased voltage will be produced across the negative coefficient resistor 15 and will substantially shorten the response time of the circuit.

FIG. 7 is a circuit wherein a positive temperature coefficient resistor shunts current to protect a varistor. Opposite terminals 20 and 21 on a varistor body 10 are connected across power supply bus lines 13 and 14. A positive temperature coefficient resistor 17 is thermally connected to the varistor body 10 and is electrically connected between a third terminal 22, disposed between the opposite terminals 20 and 21, and one of the bus 14.

Under normal operating conditions, the circuit between the buses 13 and 14 exhibits a voltage-current characteristic, typified by the curve F or FIG. 8, which is determined by the characteristic between terminals 20 and 22 of the varistor 10. If, due to excessive transient power, the temperature of the varistor should rise to a dangerous level, the resistance of the resistor will rise, shunting current through terminals 20 and 21 of the varistor and shifting the top end of the voltage-current characteristic through the shaded area to curve G, thereby decreasing the power dissipation and limiting further temperature rise. This circuit will continue to provide some transient protection under overload condition, within the temperature limitations of the varistor and, in that respect, is more suitable than prior art varistor protection circuits, for example, series fuses, which completely remove circuit protection in the event of a varistor overload.

Figure 9:
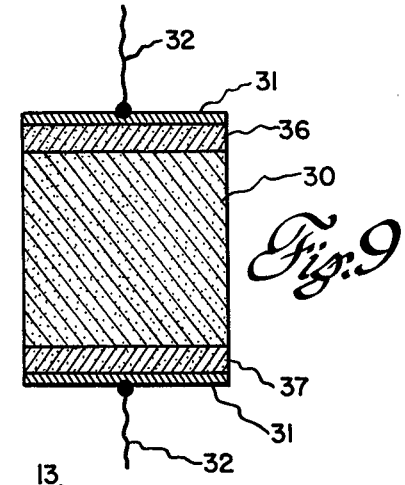
FIG. 9 is a metal oxide varistor which includes series positive temperature coefficient resistor elements.

FIG. 9 is a metal oxide varistor which includes series positive temperature coefficient resistor elements which function to limit the maximum varistor temperature.

Series positive temperature coefficient resistor elements 36 and 37 are bonded to opposite faces of a body of metal oxide varistor material 30. Metallized electrodes 31 are disposed in the outer faces of the resistor elements and may, if desired, be connected to wire loads 32 to permit connection with other circuit elements. The resistor elements, in this embodiment, carry the full varistor current and will, generally, be substantially larger than the resistors in previously described embodiments. The thermal expansion characteristics of positive temperature coefficient resistor materials are, generally, similar to those of metal oxide varistor ceramics which facilitates bonding of the resistor elements 36 and 37 to the varistor body 30.

Although the embodiment of FIG. 9 is illustrated as a two-sided device with the varistor body 30 sandwiched between the resistor elements 36 and 37; elements with similar electrical characteristics can be produced with a single resistor element bonded to one side of a varistor body. In that case, one of the electrodes 31 would be applied directly to the varistor body 30.

Under normal operating conditions, the electrical characteristics of the varistor of FIG. 9 are typified by curve F of FIG. 8. In the event that the temperature of the varistor rises to potentially destructive levels, the resistance of the resistor elements 36 and 37 will increase to shift the characteristic of curve H, and thus limit power dissipation in the varistor to safe levels. The relative magnitude of the resistance shift attributable to the resistor elements 36 and 37 may be adjusted by varying the size and composition of those elements.

The circuits of the present invention provide thermal protection for metal oxide varistor devices utilized in transient suppression and other circuit applications. The circuits may provide triggering for a silicon controlled rectifier or other similar electronic switch in the event that the total energy dissipated in the varistor exceeds a critical value and thus protect the varistors from catastrophic burn-up or explosion. The response of the circuits includes a short time delay which provents triggering if the varistor can satisfactorily handle the energy contained in the transient. A three-terminal varistor may be used to supply additional voltage derived from triggering in the event of very large, fast transient excursions.

The invention has been described above with respect to certain preferred embodiments thereof. Many changes and modifications will, however, be apparent to those skilled in the art. It is intended, therefore, by the appended claims to include all such modifications and changes as fall within the true spirit and scope of the appended claims.

The invention claimed is:

1. An electrical circuit comprising in combination:
   a body of metal oxide varistor material having at least two electrodes affixed thereto, and
   temperature responsive means thermally connected to said body of varistor material which means function to actuate an electrical switch, connected as a crowbar in shunt with two of said electrodes on said body of varistor material, at such times as the temperature of said body exceeds a predetermined level.

2. The circuit of claim 1 wherein said temperature responsive means includes a resistor having a positive temperature coefficient.

3. The circuit of claim 2 wherein said resistor is electrically connected between the gate and the cathode of a semiconductor switching device.

4. The circuit of claim 1 wherein said temperature responsive means includes a resistor having a negative temperature coefficient.

5. The circuit of claim 4 wherein said resistor is connected between the anode and the gate of a semiconductor switching device.

6. An electrical circuit comprising, in combination:
a body of metal oxide varistor material;
temperature responsive means, including a resistor having a negative temperature coefficient, thermally connected to said body of varistor material, which means function to actuate an electrical switch at such times as the temperature of said body exceeds a predetermined level;
first and second electrodes disposed on the surface of said body of metal oxide varistor material and adapted for connection to a source of electric potential;
a third electrode disposed on the surface of said body of metal oxide varistor material, intermediate said first and second electrodes, and connected to a first terminal of said resistor; and
a semiconductor switching device having an anode connected to said first electrode, a cathode connected to said second electrode and a gate connected to a second terminal of said resistor.

7. An electrical circuit element comprising in combination
a body of varistor material having attached thereto a first terminal, a second terminal, and a third terminal disposed intermediate said first terminal and said second terminal; and
a positive temperature coefficient resistor thermally connected to said body of varistor material and electrically connected between said first terminal and said third terminal.

8. The circuit element of claim 7 in combination with a source of transient electrical power connected across said first terminal and said second terminal.

9. A varistor circuit element with temperature limiting characteristics comprising:
a body of metal oxide varistor material;
at least one body of positive temperature coefficient resistor material bonded to a surface of said body of metal oxide varistor material; and
electrode means disposed on the surfaces of said bodies which function to direct applied electric currents through a series circuit formed by said body of varistor material and at least one of said bodies of resistor material;
whereby current flow in said body of metal oxide varistor material is limited to prevent excessive temperatures in said material.

* * * * *